United States Patent
Domig et al.

(10) Patent No.: US 9,233,707 B2
(45) Date of Patent: Jan. 12, 2016

(54) STEERING COLUMN FOR A MOTOR VEHICLE

(75) Inventors: Markus Domig, Bartholomäberg (AT); Odisseas Gogos, Diepoldsau (CH); Karl Plangger, Dornbirn (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 11 days.

(21) Appl. No.: 13/994,213

(22) PCT Filed: Nov. 16, 2011

(86) PCT No.: PCT/AT2011/000463
§ 371 (c)(1),
(2), (4) Date: Jul. 31, 2013

(87) PCT Pub. No.: WO2012/079096
PCT Pub. Date: Jun. 21, 2012

(65) Prior Publication Data
US 2013/0327176 A1    Dec. 12, 2013

(30) Foreign Application Priority Data

Dec. 15, 2010 (DE) .......................... 10 2010 061 268

(51) Int. Cl.
*B62D 1/16* (2006.01)
*B62D 1/19* (2006.01)

(52) U.S. Cl.
CPC ............... *B62D 1/195* (2013.01); *B62D 1/192* (2013.01)

(58) Field of Classification Search
CPC ........ B62D 1/163; B62D 1/184; B62D 1/187; B62D 1/195; B62D 1/192
USPC .................................... 74/492–496; 280/777
See application file for complete search history.

(56) References Cited

U.S. PATENT DOCUMENTS 4,793,204 A    12/1988    Kubasiak
4,900,178 A     2/1990    Haldric et al.
(Continued)

FOREIGN PATENT DOCUMENTS

DE    28 21 707    11/1978
DE    39 14 608    10/1990
(Continued)

OTHER PUBLICATIONS

International Search Report issued Mar. 16, 2012 in International (PCT) Application No. PCT/AT2011/000463.
(Continued)

*Primary Examiner* — William Kelleher
*Assistant Examiner* — Zakaria Elahmadi
(74) *Attorney, Agent, or Firm* — Wenderoth, Lind & Ponack, L.L.P.

(57) ABSTRACT

A steering column for a motor vehicle, with a bracket unit for fastening the steering column to the motor vehicle bodywork, and with at least one steering spindle bearing unit for the rotatable mounting of a steering spindle of the steering column, and with at least one bending clip for absorbing energy during a movement of the steering spindle bearing unit relative to the bracket unit by means of deformation of the bending tab. At least two bending limbs of the bending tab are connected to one another by at least one bent-over portion of the bending tab. One of the bending limbs is fastened to the steering spindle bearing unit, and the other bending limb is fastened or can be fastened to the bracket unit by at least one connecting device which can be released without being destroyed.

9 Claims, 5 Drawing Sheets

(56) References Cited

U.S. PATENT DOCUMENTS

| | | | |
|---|---|---|---|
| 4,989,898 A | 2/1991 | Yamaguchi et al. | |
| 5,029,489 A | 7/1991 | Burmeister et al. | |
| 5,320,384 A | 6/1994 | Arnold et al. | |
| 5,524,927 A | 6/1996 | Toussaint | |
| 5,547,221 A * | 8/1996 | Tomaru et al. | 280/777 |
| 5,580,091 A | 12/1996 | Doty | |
| 5,606,892 A * | 3/1997 | Hedderly | 74/493 |
| 6,095,012 A | 8/2000 | Lutz | |
| 6,139,057 A | 10/2000 | Olgren et al. | |
| 6,276,719 B1 | 8/2001 | Gartner | |
| 6,378,903 B1 | 4/2002 | Yabutsuka et al. | |
| 6,394,241 B1 | 5/2002 | Desjardins et al. | |
| 6,592,148 B2 * | 7/2003 | Byers et al. | 280/777 |
| 7,350,815 B2 | 4/2008 | Spano et al. | |
| 7,422,239 B2 | 9/2008 | Ishibashi et al. | |
| 7,685,903 B2 | 3/2010 | Streng et al. | |
| 7,703,804 B2 | 4/2010 | Cymbal et al. | |
| 7,721,620 B2 | 5/2010 | Matsui et al. | |
| 7,866,699 B2 | 1/2011 | Levin et al. | |
| 7,891,268 B2 | 2/2011 | Park | |
| 7,896,395 B2 * | 3/2011 | Cymbal et al. | 280/777 |
| 8,065,931 B1 | 11/2011 | Marable et al. | |
| 8,408,089 B2 * | 4/2013 | Oshita et al. | 74/492 |
| 8,500,168 B2 | 8/2013 | Goulay et al. | |
| 8,783,717 B2 * | 7/2014 | Tinnin et al. | 280/777 |
| 2002/0020999 A1 | 2/2002 | Duval et al. | |
| 2003/0000330 A1 | 1/2003 | Murakami et al. | |
| 2004/0232685 A1 | 11/2004 | Gatti et al. | |
| 2006/0090586 A1 | 5/2006 | Lee | |
| 2006/0181070 A1 * | 8/2006 | Imamura et al. | 280/777 |
| 2006/0243089 A1 | 11/2006 | Cymbal et al. | |
| 2006/0290128 A1 * | 12/2006 | Ridgway et al. | 280/777 |
| 2007/0013182 A1 * | 1/2007 | Bechtel et al. | 280/777 |
| 2007/0137377 A1 | 6/2007 | Kamei | |
| 2007/0170711 A1 * | 7/2007 | Bechtel et al. | 280/775 |
| 2007/0194563 A1 * | 8/2007 | Menjak et al. | 280/777 |
| 2007/0252372 A1 | 11/2007 | Spano et al. | |
| 2008/0191457 A1 * | 8/2008 | Ridgway et al. | 280/775 |
| 2008/0229867 A1 | 9/2008 | Waibel et al. | |
| 2008/0236325 A1 | 10/2008 | Ridgway et al. | |
| 2008/0257097 A1 | 10/2008 | Graf | |
| 2008/0284150 A1 | 11/2008 | Yamada | |
| 2009/0013817 A1 | 1/2009 | Schnitzer et al. | |
| 2010/0018340 A1 | 1/2010 | Schnitzer et al. | |
| 2010/0031768 A1 * | 2/2010 | Oshita et al. | 74/492 |
| 2010/0275721 A1 | 11/2010 | Davies et al. | |
| 2010/0282016 A1 * | 11/2010 | Oehri et al. | 74/493 |
| 2010/0300237 A1 | 12/2010 | Ridgway et al. | |
| 2010/0300238 A1 | 12/2010 | Ridgway et al. | |
| 2011/0041642 A1 | 2/2011 | Havlicek | |
| 2011/0115206 A1 | 5/2011 | Sulser et al. | |
| 2011/0174028 A1 | 7/2011 | Bahr et al. | |
| 2011/0210537 A1 | 9/2011 | Uesaka | |
| 2012/0024101 A1 | 2/2012 | Schnitzer et al. | |
| 2012/0125139 A1 | 5/2012 | Tinnin et al. | |
| 2012/0266716 A1 * | 10/2012 | Sulser et al. | 74/493 |
| 2013/0074641 A1 | 3/2013 | Schnitzer et al. | |
| 2013/0118292 A1 | 5/2013 | Sulser et al. | |

FOREIGN PATENT DOCUMENTS

| | | |
|---|---|---|
| DE | 10 2005 052 123 | 1/2007 |
| DE | 10 2007 002 091 | 7/2008 |
| DE | 10 2007 003 091 | 8/2008 |
| DE | 10 2008 007 094 | 10/2009 |
| DE | 10 2008 007 093 | 11/2009 |
| EP | 0 179 690 | 4/1986 |
| EP | 0 323 298 | 7/1989 |
| EP | 0 537 454 | 4/1993 |
| EP | 0 641 705 | 1/1997 |
| EP | 0 802 104 | 10/1997 |
| EP | 1 464 560 | 10/2004 |
| EP | 1 479 593 | 11/2004 |
| EP | 1 125 820 | 3/2008 |
| EP | 1 955 921 | 8/2008 |
| EP | 1 975 036 | 10/2008 |
| FR | 2 781 748 | 2/2000 |
| FR | 2 840 869 | 12/2003 |
| FR | 2 881 707 | 8/2006 |
| GB | 1 296 527 | 11/1972 |
| GB | 2 288 154 | 10/1995 |
| GB | 2 291 840 | 2/1996 |
| GB | 2 311 839 | 10/1997 |
| GB | 2 454 345 | 5/2009 |
| JP | 62-161081 | 10/1987 |
| JP | 7-117685 | 5/1995 |
| JP | 9-2294 | 1/1997 |
| JP | 2004-67012 | 3/2004 |
| JP | 2006-096120 | 4/2006 |
| WO | 2006/042604 | 4/2006 |
| WO | 2007/048153 | 5/2007 |
| WO | 2008/071306 | 6/2008 |
| WO | 2009/121386 | 10/2009 |
| WO | 2009/147325 | 12/2009 |
| WO | 2010/000980 | 1/2010 |
| WO | 2010/009486 | 1/2010 |
| WO | WO 2010009486 A2 * | 1/2010 |

OTHER PUBLICATIONS

Chinese Office Action dated Feb. 28, 2015 in corresponding Chinese Patent Application No. 201180053561.2 (with English translation).

* cited by examiner

STEERING COLUMN FOR A MOTOR VEHICLE

BACKGROUND OF THE INVENTION

The present invention relates to a steering column for a motor vehicle, with a bracket unit for securing the steering column on the body of the motor vehicle and with at least one steering spindle bearing unit for the rotatable bearing of a steering spindle of the steering column and with at least one bending tab for the energy absorption during a movement of the steering spindle bearing unit relative to the bracket unit by means of deformation of the bending tab. At least two bending legs of the bending tab are connected with one another by means of at least one recurvature of the bending tab, and one of the bending legs is secured on the steering spindle bearing unit and the other bending leg is secured or is securable on the bracket unit by means of at least one connecting device which can be detached nondestructively.

Steering columns of this type are known per se in prior art. WO2009/121386 A1 discloses several different implementations of such steering columns. The document already mentions that the bending tab provided for the energy absorption in the event of a crash can be a pure bending tab but also a tearing-open bending tab. In the case of a pure bending tab, the energy absorption during the movement of the steering spindle bearing unit relative to the bracket unit takes place exclusively by means of deformation of the bending tab. In the case of tearing-bending tabs, in addition to the deformation, further energy absorption can be attained thereby that the bending tab is torn out of a frame or the like.

The invention addresses the problem of improving a generic steering column to the extent that it takes up the least installation space possible. It is further to be prevented that the bending tab is raised during the relative movement of the steering spindle bearing unit with respect to the bracket unit in the event of a crash.

SUMMARY OF THE INVENTION

This is attained in a steering column according to the invention through the features described below.

It is consequently provided that on the steering spindle bearing unit, at least one holding-down device is disposed with at least one guide wall for delimiting the raising of the bending leg, secured or securable on the bracket unit, from the steering spindle bearing unit during the deformation of the bending tab.

The guide wall of the holding-down device delimits the volume in which raising the bending leg secured on the bracket unit by means of a connecting device is possible at all. Depending on the spacing between the relevant outer wall of the steering spindle bearing unit and the guide wall of the holding-down device, either no raising of the bending leg from the steering spindle bearing unit occurs or only a minimal one. Further raising is prevented by the guide wall. Due to the disposition of the holding-down device on the steering spindle bearing unit, the installation space and the demands made of the tolerances of the structural parts can be reduced. It suffices, in particular, to develop only the relatively short region, in which the continuing deformation of the bending leg occurs, with the holding-down device. The region, in which the one bending leg with the nondestructively detachable connecting device can be secured on the bracket unit, does not need to fulfill special conditions with the aid of which a holding-down function could be produced. This yields considerable freedoms in the development. These new freedoms can advantageously be utilized for the production of the nondestructively detachable connecting device. The prevention of the raising of the bending leg from the guide wall, as a rule, is only employed when the nondestructively detachable connecting device is in its arrest position in which the bending leg is secured thereon and if, due to a motor vehicle crash or the like, in this position of the connecting device a relative movement, in particular a mutual dislocation, of steering spindle bearing unit and bracket unit occurs.

The steering columns according to the invention are preferably so-called adjustable steering columns in at least the length direction. In order to adapt the position of the steering wheel to the particular driver, these steering columns provide that steering spindle bearing unit and bracket unit can be moved relative to one another with low force expenditure if a corresponding securement device is in its opened position. In the closed position of the securement device, the steering spindle bearing unit is retained so fixedly on the bracket unit that during normal operation of the motor vehicle no relative movement between steering spindle bearing unit and bracket unit occurs. Only in the event of a crash, for example if the driver is thrown against the steering wheel, forces of such magnitude occur that the energy absorption process realized by means of the bending tab proceeds. It is required for the production of the energy absorption process for the bending tab to be at least connected with the bracket unit during the crash. For this purpose the nondestructively detachable connecting device can serve. The nondestructively detachable connecting device can, as and when required, be set between a closed state in the arrest position, in which one of the bending legs is connected with the bracket unit, and an opened state, in which the bending leg is not connected with the bracket unit. In particular, changing over between the closed and the opened position can take place multiple times. Therefore, in the preferred adjustable steering column, notably by means of the connecting device, disengagement of the connection between the bending leg and the bracket unit is enabled in order, in the opened position of the securement device, to disconnect the connection between the bending tab and the bracket unit to enable the displacement without energy absorption on the bending tab. In the closed position of the securement device, the same connecting device is preferably in its arrest position in which, either immediately or after a small relative movement between steering spindle bearing unit and bracket unit, a connection is established between the bending tab and the bracket unit. In the simplest case such a connecting device can be formed by a hook with at least one snap-in tooth, wherein the snap-in tooth in the arrest position is pressed onto the bending tab under spring-elastic loading. In the bending tab are provided recesses or cutouts into which the hook directly, or after a small relative movement, snaps in between the steering spindle bearing and bracket unit.

Instead of a hook with a snap-in tooth, several snap-in teeth and/or several hooks, even of different sizes, can also be provided to facilitate the engagement.

With the securement device closed, the steering spindle bearing unit in the event of a crash is moved, preferably shifted, relative to the bracket unit. By means of deformation of the bending tab the desired energy absorption occurs in order to avoid as much as possible injuries to the driver or to mitigate them as significantly as possible. In this crash event, the holding-down device according to the invention ensures that the bending tab during its deformation is raised not at all or not too far from the steering spindle bearing unit. Thereby only minimal installation space for the bending tab needs to be provided. The holding-down device further offers the feasibility of keeping the bending radius of the bending tab within limits in its recurvature without necessitating that the bending tab be bent about an anvil, a deform element or the like. The advantage of foregoing the use of an anvil or a deform element about which the bending tab is bent or pulled during the deformation, should primarily be seen under two aspects. On the one hand, the necessity of an additional element in the form of an anvil or deform element no longer applies. On the other hand, it has been found in practice that if such deform elements or anvils are utilized, the frictional forces occurring between the bending tab and the anvil or the deform element can only be controlled or predicted with difficulty. The deformation of the bending tab by means of the holding-down device according to the invention is with advantage a deformation without anvil or deform element whose movement path is given or is delimited by the guide wall or the guide walls of the holding-down device.

The invention can involve a pure bending tab, but also a combined tearing-bending tab, thus a bending tab in which, in addition to the pure deformation, tearing-open is also provided. Preferred embodiments of the invention provide that the bending leg, secured or securable on the bracket unit at least during the deformation of the bending tab, is in contact on the guide wall.

Delimiting the raising herein subsequently takes place thereby that the bending leg secured on the bracket unit comes to rest in contact on the guide wall at least during the deformation.

Especially preferred embodiments of the invention provide a holding-down device developed as a type of channel. To this end, it is advantageous if the holding-down device comprises at least one additional guide wall, with the bending legs being at least regionally disposed between the opposingly disposed guide walls. In these embodiments, it is again preferable that the bending leg secured on the steering spindle bearing unit is at least during the deformation of the bending tab in contact on the additional guide wall.

For the sake of completeness, reference is made to the fact that the bending leg secured on the steering spindle bearing unit is a portion of the bending tab which serves for securing the bending tab on the steering spindle bearing unit. Conversely, the bending leg secured or securable on the bracket unit by means of at least one nondestructively detachable connecting device is that portion of the bending tab which serves for securing the bending tab on the bracket unit. This does not mean that the bending leg secured on the steering spindle bearing unit is, of course, only securable or secured via the recurvature, and the other bending leg is also securable or secured on the bracket unit, and conversely. Reference is further made to the fact that the term bending tab should be interpreted broadly. The bending tab can in particular be comprised of a tape- and/or wirelike material. It is further conceivable and feasible for the bending tab to be torn out of a base body during the deformation and also able to be appropriately developed as a bending-tearing tab. Within the scope of the present invention, this embodiment is also included in the term "bending tab".

Due to an indentation in the steering spindle bearing unit, the bending tab with its bending legs, disposed in particular in the shape of a U, can at least be partially sunk into the depth of the steering spindle bearing unit. The bending leg, secured on the steering spindle bearing unit, is correspondingly appropriately disposed at a lesser distance with respect to a rotational axis, about which the steering spindle is rotatable, than the regions, circumjacent to this bending leg, of an outer wall of the steering spindle bearing unit. In addition to the bending leg, the region, in which the deformation of the recurvature of the bending tab is to occur in the event of a crash, is advantageously located between a wall, which is disposed at a lesser distance from a rotational axis, about which the steering spindle is rotatable, than the regions circumjacent to this bending leg, of an outer wall of the steering spindle bearing unit and the guide wall for delimiting the raising of the bending tab of the holding-down device. It is equally conceivable and feasible to sink the outer wall of the steering spindle bearing unit into the corresponding region opposite the neighboring regions.

In this case, it is advantageous if correspondingly a holding-down device is developed with an additional guide wall and the holding-down device is disposed on the steering column such that the additional guide wall is disposed closer to a rotational axis, about which the steering spindle is rotatable, than the regions, circumjacent to this additional guide wall, of an outer wall of the steering spindle bearing unit and/or than the guide wall for delimiting the raising of the bending leg secured or securable on the bracket unit. The outer wall of the steering spindle bearing unit can in this case be cut out in the relevant region such that the additional guide wall can be inset from the outside into the steering spindle bearing unit such that it is flush countersunk.

The holding-down device can initially be separately fabricated and subsequently be disposed as a unit on the steering spindle bearing unit. In alternative implementations, the holding-down device can, however, also be a unitarily formed-on component of the steering spindle bearing unit and, in particular its outer wall.

BRIEF DESCRIPTION OF THE DRAWINGS

Further details and features of preferred embodiments of the invention will be explained in conjunction with the figures, in which.

DETAILED DESCRIPTION OF THE INVENTION

Similar elements or elements producing the same effect are denoted in the Figures by the same reference symbols.

Figure 1:
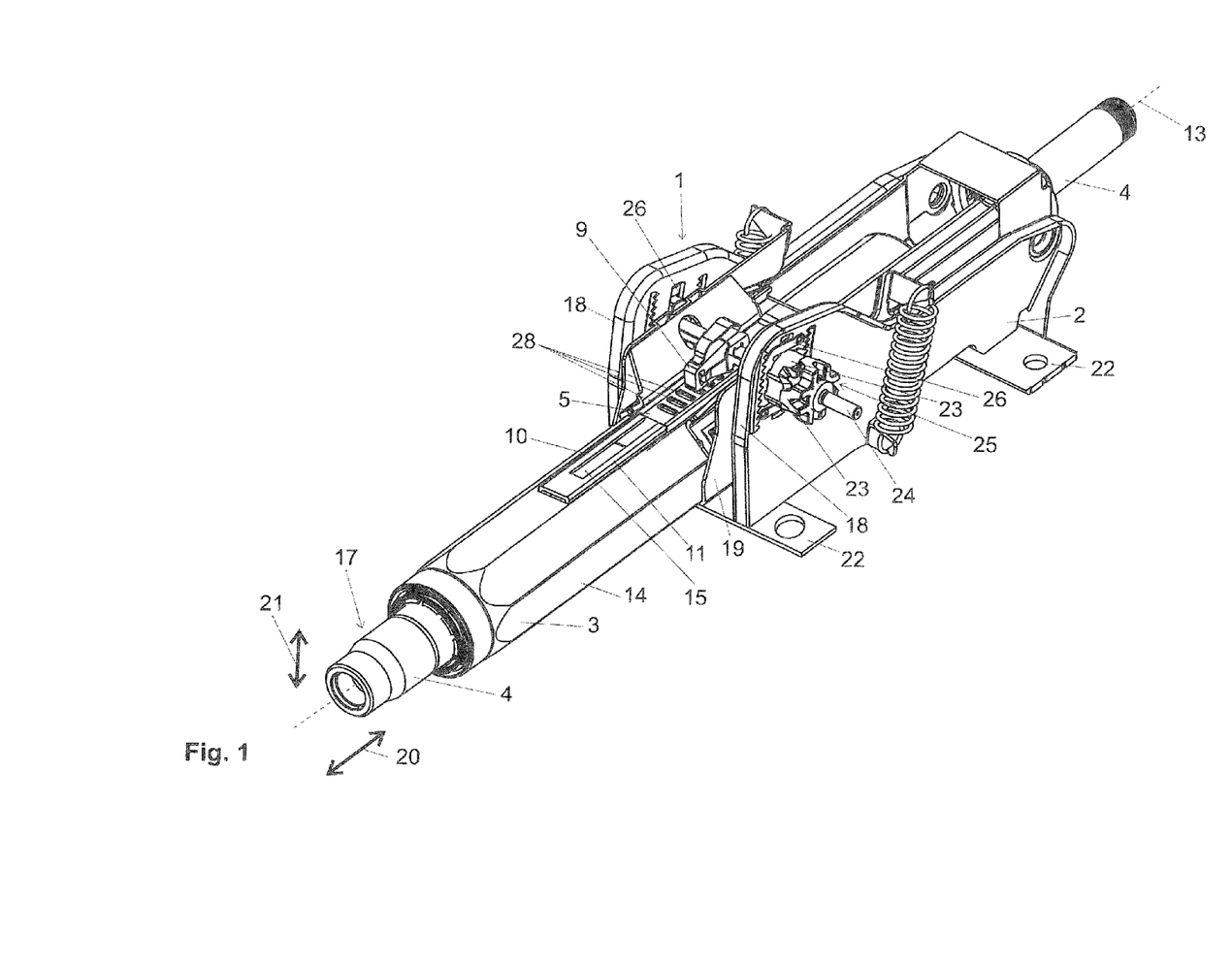
FIG. 1 is a perspective view of a first embodiment of a steering column according to the invention in a position rotated about 180° with respect to the installation situation.

The steering column 1 depicted in FIG. 1, is according to the invention, equipped with a corresponding holding-down device 10. Before discussing these details essential to the invention, first, the structure, otherwise known per se, of the steering column will be briefly described here. The steering column 1 comprises a bracket unit 2 which serves for securing the steering column 1 on the body of the motor vehicle. In the depicted embodiment securement plates 22 of the bracket unit 2 are provided for this purpose, by means of which the latter can be bolted or otherwise secured on the autobody. The bracket unit 2 comprises two side jaws 18 between which the steering spindle bearing unit 3 is retained. In the depicted embodiment between the bracket unit 2 or its side jaws 18 and the steering spindle bearing unit 3 a so-called intermediate lever 19 is located, as is frequently the case in prior art. The steering column in the depicted embodiment is a so-called adjustable steering column 1 with a securement device 25 known per se. When the securement device 25 is in the opened position, the steering spindle bearing unit 3 can be displaced with minimal force expenditure for the length adjustment in the setting directions 20 and/or for the height adjustment in the setting directions 21 relative to the bracket unit 2, and therewith relative to the autobody. The steering wheel, to be secured on the mounting adapter 17 of the steering spindle 4, is hereby also correspondingly adjusted by which the particular driver of the motor vehicle can adapt the position of the steering wheel to his individual requirements. The steering spindle 4 is supported in the steering spindle bearing unit 3 such that it is rotatable about the rotational axis 13. The steering spindle bearing unit 3 is a type of jacket unit whose outer wall 14 encompasses the steering spindle 4.

As is known per se, the securement device 25 comprises a bolt 24 in the form of a clamp bolt. On this bolt are disposed two cam disks 23, their cams directed toward one another. The one cam disk 23 can be secured, for example torsion-tight, on the bolt 24, the other cam disk 23 in this case can be secured torsion-tight on one of the side jaws 18. By turning the clamp bolt 24 the cam disks 23 and the cams disposed thereon are therewith turned with respect to one another whereby the securement device 25 can be brought into its opened and its closed state. For rotating the clamp bolt 24 motors can be provided. However, it is also feasible to provide a manual lever 27. Variants are also conceivable in which the bolt 24 itself is not rotated. In the closed position of the securement device 25 the motor vehicle is ready for operation and the steering spindle bearing unit 3 is fixed in its position with regard to the forces occurring in normal operation. In the opened state of the securement device 25 displacements in the setting directions 20 and/or 21, thus in the length and/or height direction, are feasible. It is also conceivable for only one of the setting directions, thus either only a height or only a length adjustment, to be provided. The described clamping or securement device 25 can, as is known per se in prior art, be based purely on friction closure, or purely on form closure, or also on a combination of these two mechanisms. In the depicted embodiment, an elongated hole 26 is provided in each side jaw 18 through which the clamp bolt 24 is guided. The elongated holes 26 permit shifting the clamp bolt 24, including the steering spindle bearing unit 3, in the setting directions 21. For the length adjustment in the setting directions 20, the steering spindle bearing unit 3 is shifted in the intermediate lever 19. In the closed position of the securement device 25, in which the motor vehicle is being driven, the nondestructively detachable connecting device 9 is provided for securing the bending leg 7 on the bracket unit 2 at least in the event of a crash. With the securement device 25 opened, this connection of the bending leg 7 with the bracket unit 2 must be disconnected in order to enable the already described adaptations of the position of the steering wheel in the setting directions 20 and 21. As will be described later in detail, in the depicted embodiment the connecting device 9 detachable nondestructively is a swivelable hook. This swivelable hook is supported in the depicted embodiment on bolt 24 of the securement device 25. In the prior art, diverse connecting devices 9 are known which can fundamentally be employed. These can be appropriately adapted as alternatives to realizations depicted here. Of the bending tab 5, only the bending leg 7 with its recesses or cutouts 28 can be seen in the depiction according to FIG. 1. The recesses 28 serve for the engagement of the connecting device 9 and therewith for the securement of this bending leg 7 on the bracket unit 2. The holding-down device 10 essential to the invention is only partially visible in FIG. 1. What is, in fact, visible is its guide wall 11 and the cutout 15 disposed in this guide wall 11, into which, in the event of a crash, as will be explained later in detail, the connecting device 9 can be inserted. The remaining details regarding the bending tab 5 and the holding-down device 10, as well as their cooperation in the event of a crash, are analogously evident for this first embodiment based on the following explanations of the second embodiment of the invention such as will be explained in conjunction with FIGS. 2 to 8.

Figure 2:
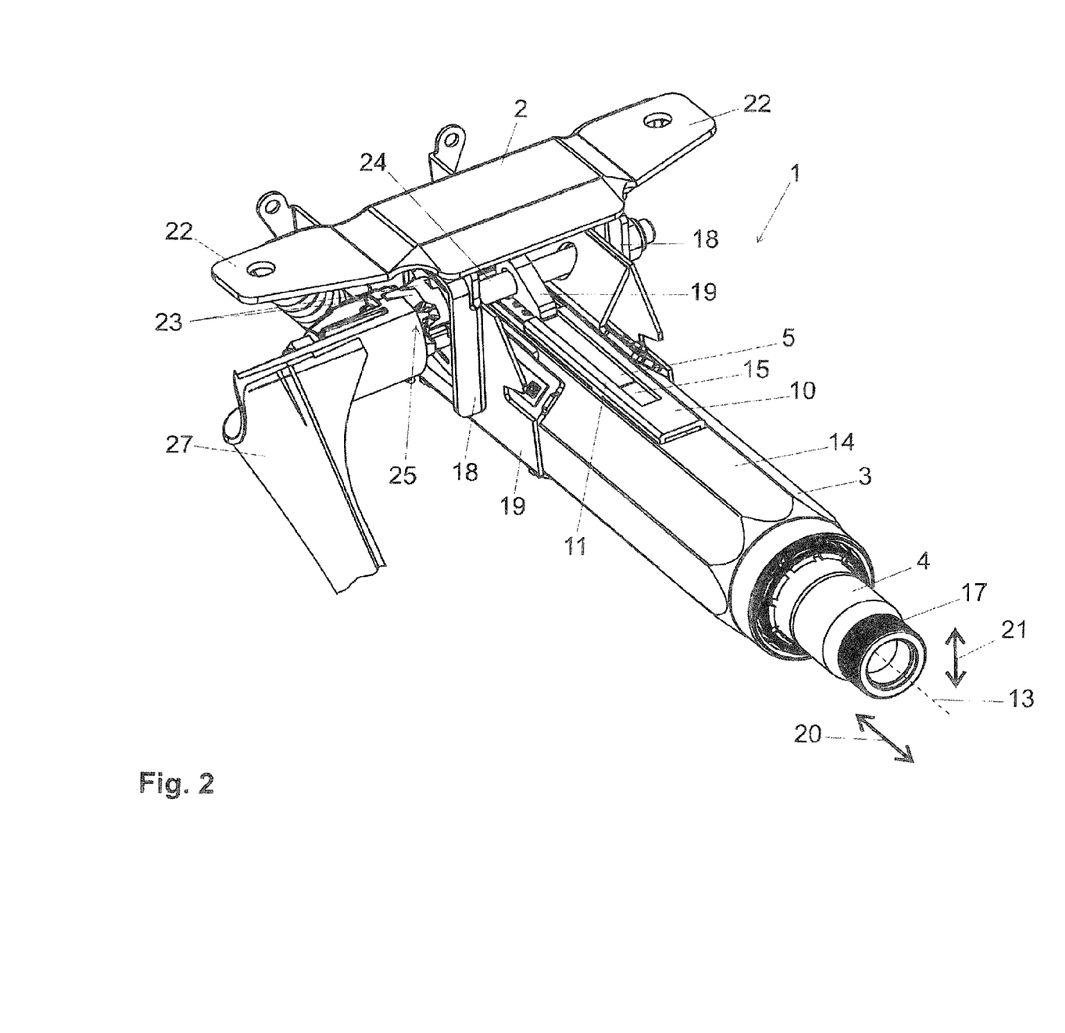
FIG. 2 shows a second embodiment of a steering column according to the invention in a position according to the installation situation.

FIG. 2 shows a second embodiment according to the invention of an adjustable steering column 1. Its fundamental structure is analogous to the first embodiment and will therefore not be repeated. The difference between the two embodiments is essentially that in the first embodiment, the clamp bolt 24 is disposed on the side of the steering spindle bearing unit 3 opposite the securement plates 22, while in FIG. 2 the clamp bolt 24 in the depicted mounting position is disposed on the same side of the steering spindle bearing unit as the securement plates, thus between the steering spindle bearing unit 3 and the securement plates 22.

Figure 3:
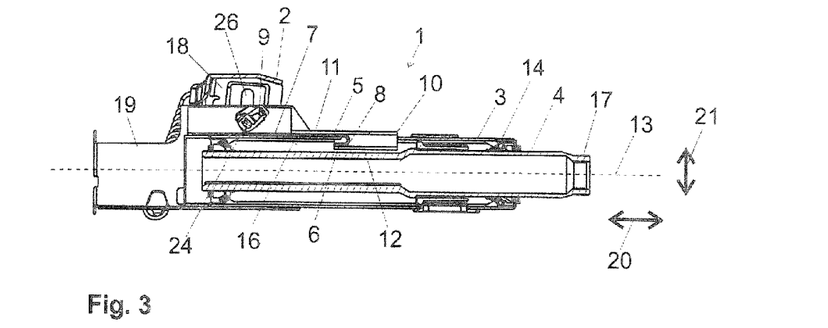
FIGS. 3 to 5 show longitudinal sections through this second embodiment.
Figure 4:
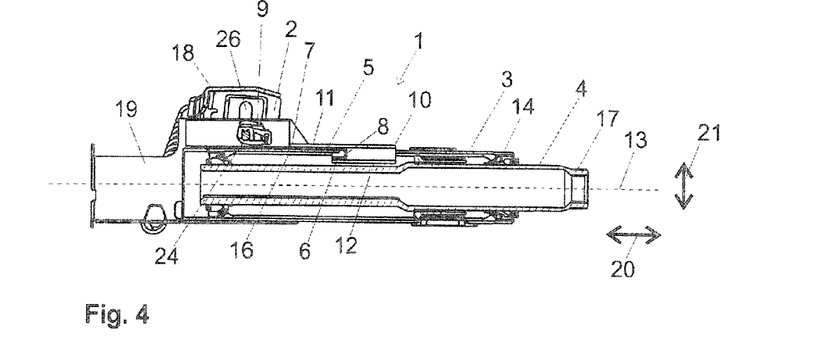
Figure 5:
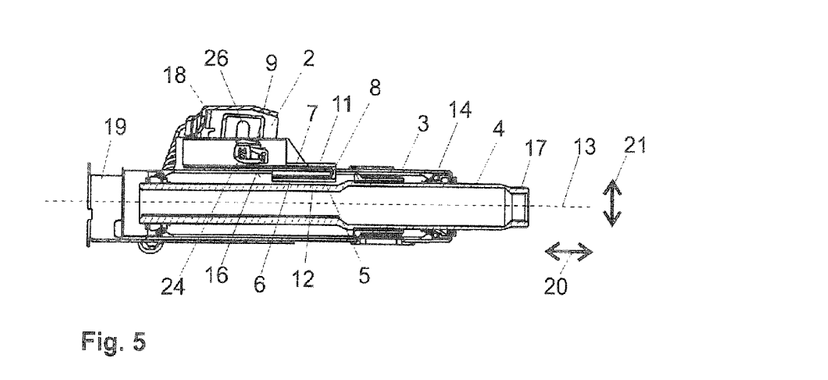

To be better able to illustrate the cooperation according to the invention of bending tab 5 and holding-down device 10, FIGS. 3 to 5 show longitudinal sections through the steering column 1 of FIG. 2. FIG. 3 shows a situation in which the securement device 25 is in its opened position in which the steering spindle bearing unit 3 is displaceable in the setting directions 20 and 21 relative to the bracket unit 2 in order to enable the adaptation of the position of the steering wheel, not shown here, to the particular driver. In this situation, the connecting device 9 is in the position in which it does not connect the bending tab 5 or its bending leg 7 with the bracket unit 2. FIG. 4 shows the situation in which the securement device 25 is in the closed position. This corresponds to an operation position in which the motor vehicle is being driven in normal operation. The detachable connecting device 9 in this case has snapped into at least one of the recesses 28 of the bending leg 7 in order to secure thus the bending leg 7 on the bracket unit 2. However, in this operation position there are also possible positions in which the connecting device 9, here implemented as a hook with a snap-in element, comes to rest in contact on one of the intermediate webs between the recesses 28 of the bending leg 7. In such a case, only with a dislocation of the steering spindle bearing unit 3 with respect to the bracket unit 2, as takes place, for example, in the event of a crash, does the snapping-in occur, and therewith the securement of the bending leg 7 on the bracket unit 2.

The second bending leg 6 in all of these situations and for all depicted embodiments is permanently connected with the holding-down device 10 and therewith with the steering spindle bearing unit 3. In the practical embodiment, it is secured or fixed directly on the additional guide wall 12 of the holding-down device 10. FIGS. 3 to 5 especially clearly show that the additional guide wall 12 is disposed closer to the rotational axis 13, about which the steering spindle 4 is rotatable, than the regions, circumjacent to this additional guide wall 12, of the outer wall 14 of the steering spindle bearing unit 3. In this embodiment, further, the guide wall 11 is also further removed from the rotational axis 13 than is the additional guide wall 12. The holding-down device 10 is consequently partially sunk into the inner volume encompassed by the outer wall 14 of the steering spindle bearing unit 3, which enables an especially planar and shallow construction. Bending legs 6 and 7 are connected with one another across the recurvature 8 and are guided between the guide wall 11 and the additional guide wall 12. The holding-down device 10 in the depicted embodiment is a unit initially fabricated separately which is disposed on the steering spindle bearing unit 3. However, it would be equally well feasible to integrate the guide wall 11 and 12 through corresponding outformings, for example in the form of pockets, of the outer wall 14 directly, or as unitarily formed-on components, into the steering spindle bearing unit 3.

If, starting from the normal operation situation depicted in FIG. 4, a motor vehicle crash occurs, upon a corresponding impact of the motor vehicle driver onto the steering wheel, not shown here, the steering spindle bearing unit 3 is pushed into the vehicle-stationary bracket unit 2. During this pushing-in, a deformation of the bending tab 5 occurs with which kinetic energy can systematically be dissipated or absorbed. FIG. 5 shows the end position of such an energy absorption process in which the steering spindle bearing unit 3, together with the steering spindle 4 and the steering wheel (not shown here) secured thereon, has been dislocated in the direction of the motor vehicle front whereby the steering spindle bearing unit 3 was pushed into the bracket unit 2. During this pushing-in process, the bending leg 7 is fixed on the bracket unit 2 by means of the connecting device 9. The bending leg 6 is permanently fixed on the steering spindle bearing unit 3. The holding-down device 10 is dislocated together with the steering spindle bearing unit 3. The bending tab 5 is herein deformed.

According to the invention, the guide wall 11 prevents in this deformation process the bending tab from being raised or raised too far from the steering spindle bearing unit 3. The guide wall 12 prevents the bending tab 5 during the deformation process from penetrating too far into the inner volume of the steering spindle bearing unit 3. The range of motion of the two bending legs 6 and 7 is given or delimited via the interspace between the two guide walls 11 and 12. In the deformation process, the bending legs 6 and 7 come, as a rule, to rest in contact on the particular guide walls 11 and 12, if they were previously not already in contact, whereby the holding-down device 10 predetermines a defined type of deformation of the bending tab 5. This leads to a highly defined devolution of the energy absorption. To avoid additional friction forces on the inner surface 16 of outer wall 14 of the steering spindle bearing unit 3, advantageously, as provided in this embodiment, the bending legs 6 are preferably always spaced apart from an interiorly located surface 16, pointing toward a rotational axis 13, about which the steering spindle 4 is rotatable, of an outer wall 14 of the steering spindle bearing unit 3.

It is not provided and not required in this structure to secure the bending leg 6, connected with the steering spindle bearing unit 3, on the inside of the outer wall 14 in order to reduce the installation space, which simplifies the assembly. It should, further, be pointed out that, as can be seen especially well in FIG. 7, a cutout 15 is introduced into the guide wall 11 for delimiting the raising of the bending leg 7, secured or securable on the bracket unit 2, into which cutout the connecting device 9, here developed in the form of the hook and detachable nondestructively, can penetrate during the movement of the steering spindle bearing unit 3 relative to the bracket unit 2. This type of implementation enables a short installation length of the steering column 1.

At the end of the described energy absorption process in which the bending tab 5 has been deformed, the bending legs 6 and 7 also continue as before not to project from the steering spindle bearing unit 3 or project into it. They continue as before to be guided between the guide walls 11 and 12 which overall enables the desired planar and shallow construction.

Figure 6:
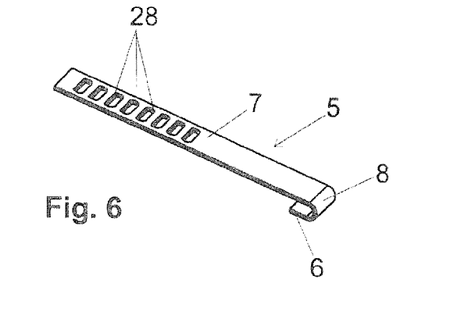
FIG. 6 shows the bending tab utilized.
Figure 7:
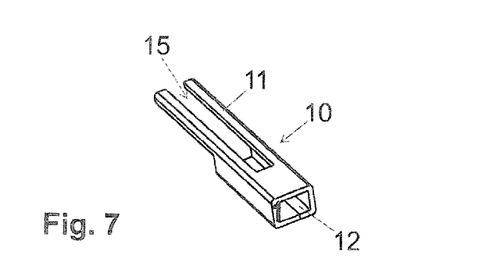
FIG. 7 shows the holding-down device utilized.

FIG. 6 shows the bending tab 5 in the installed state, thus before the deformation in the event of a crash, uncoupled from the other components of the steering column 1. FIG. 7 shows the holding-down device 10 utilized in this embodiment, which device is initially developed as a separate structural part and is subsequently secured partially sunk into a corresponding recess in the outer wall 14 of the steering spindle bearing unit 3. As already explained, the guide walls 11 and 12 can, however, also be formed out as an integral component part of the steering spindle bearing unit 3.

Figure 8:
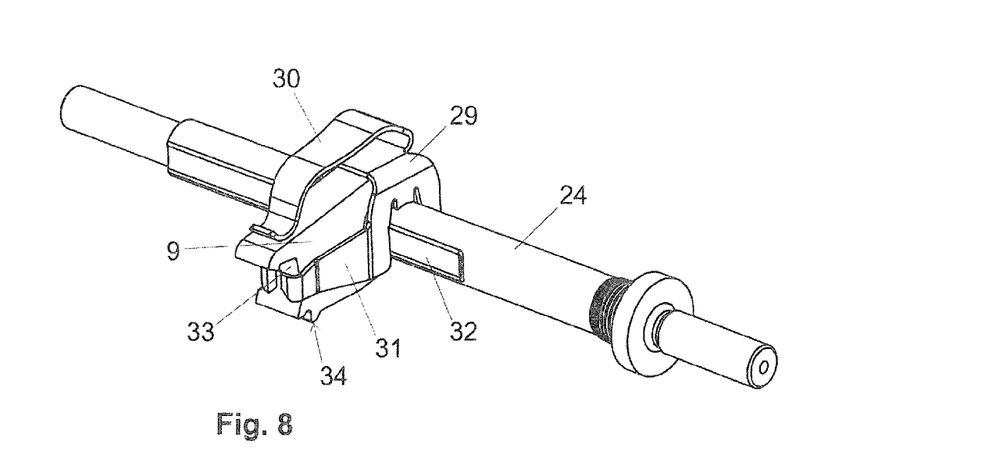
FIG. 8 is a detail illustration of a utilized example of a nondestructively detachable connecting device.

FIG. 8 shows the hook-like connecting device 9 utilized here with a single snap-in tooth 34 as it is disposed on the clamp bolt 24 of the securement device 25. A recess, not shown here in detail, of the hook-shaped connecting device through which the clamp bolt 24 is guided, is so implemented that the hook or the connecting device 9, can freely rotate about the bolt 24. For the operational connection of bolt 24 and connecting device 9 a spring body 29 is disposed on the clamp bolt 24. The spring body 29 encompasses the hook-shaped connecting device 9 and is secured on bolt 24 under form fit via a form closure 32 such that a rotation of bolt 24 about its longitudinal axis leads by necessity to a corresponding entraining rotation of spring body 29. The spring body 29 includes a spring tongue 30 which presses, or spring loads, the connecting device 9 in the direction toward the bending leg 7. The spring body 29 comprises yet additionally also two entrainer arms 31, which, with the corresponding rotation of bolt 24, and therewith of spring body 29, after a certain free path abut the stop elements 33 of the connecting device 9 and in this way subsequently entrain the hook-shaped connecting device 9 in this direction. With the structure depicted in detail in FIG. 8, the spring tongue 30 presses the snap-in tooth 34 onto the bending leg 7 or, given the corresponding position, into a recess 28 as long as the securement device 25 is closed, which corresponds to the situations in FIGS. 4 and 5. If the securement device 25 is brought into its opened position, then, starting at a certain rotational angle of bolt 24, the entrainer arms 31 entrain the connection device 9 as soon as the entrainer arms 31 abut the stop elements 33. The snap-in tooth 34 is hereby raised from the bending leg 7 such that the condition according to FIG. 3 is reached and the steering spindle bearing unit 3 can be displaced for setting the position of the steering wheel relative to the bracket unit 2 without exerting an effect onto the bending tab 5. To improve the engagement of the connecting device 9 into the recesses 28 of the bending tab, several snap-in teeth, also of different sizes, can also be provided.

Figure 9:
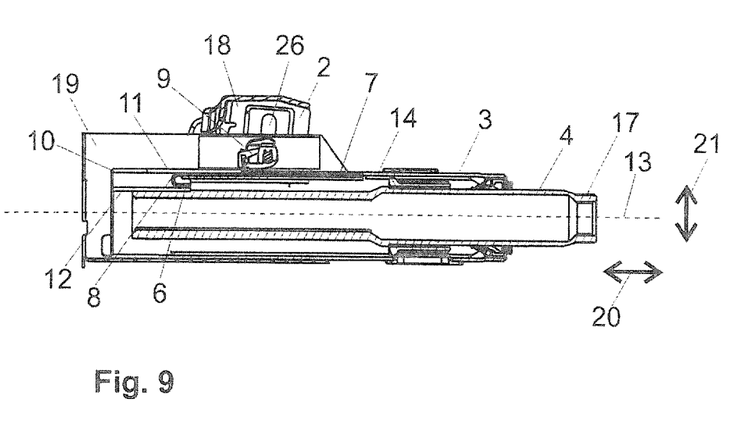
FIG. 9 shows a further embodiment of the invention in a position analogous to FIG. 5.

FIG. 9 shows a further embodiment in a longitudinal section analogous to FIG. 5. Here is also shown the end of a deformation, and therewith energy absorption, process in which the steering spindle bearing unit 3 has been pushed into the bracket unit 2. In this embodiment, the recurvature 8 between the two bending legs 6 and 7 points in the direction toward the motor vehicle front, thus away from the mounting adapter 17 for the steering wheel. In this embodiment according to FIG. 9, the same holding-down device 10 can also be utilized according to the invention as has already been explained in conjunction with the other embodiments. Its guide walls 11 and 12 correspondingly delimit and guide the bending legs 6 and 7 during the deformation process.

LEGEND TO THE REFERENCE NUMERALS

1 Steering column
2 Bracket unit
3 Steering spindle bearing unit
4 Steering spindle
5 Bending tab
6 Bending leg
7 Bending leg 8 Recurvature
9 Connecting device
10 Holding-down device
11 Guide wall
12 Additional guide wall
13 Rotational axis
14 Outer wall
15 Cutout
16 Inner surface
17 Mounting adapter
18 Side jaw
19 Intermediate lever
20 Setting direction
21 Setting direction
22 Securement plate
23 Cam disk
24 Bolt
25 Securement device
26 Elongated hole
27 Manual lever
28 Recess
29 Spring body
30 Spring tongue
31 Entrainer arm
32 Form closure
33 Stop element
34 Snap-in tooth

The invention claimed is:

1. A steering column for a motor vehicle, the steering column being adjustable in at least a length direction, the steering column comprising:
- a bracket unit for securing the steering column on the body of the motor vehicle;
- a steering spindle bearing unit for rotatably supporting a steering spindle of the steering column; and
- a bending tab for energy absorption during a movement of the steering spindle bearing unit relative to the bracket unit by deformation of the bending tab,
- wherein at least two bending legs of the bending tab are connected with one another by a recurvature of the bending tab, a first one of the bending legs being secured on the steering spindle bearing unit and a second one of the bending legs being secured or securable by a nondestructively detachable connecting device on the bracket unit,
- wherein on the steering spindle bearing unit, at least one holding-down device with a guide wall is disposed for delimiting the raising of the second one of the bending legs from the steering spindle bearing unit during the deformation of the bending tab, and wherein the guide wall is configured to delimit the raising of the second one of the bending legs and has a cutout into which the nondestructively detachable connecting device penetrates during a movement of the steering spindle bearing unit relative to the bracket unit,
- and wherein the cutout and the first one of the bending legs are arranged on opposite sides of the second one of the bending legs.

2. The steering column of claim 1, wherein the second one of the bending legs rests in contact on the guide wall at least during the deformation of the bending tab.

3. The steering column of claim 1, wherein the guide wall is a first guide wall, the holding-down device comprising a second guide wall, wherein the bending legs are at least regionally disposed between the first guide wall and the second guide wall disposed opposite one another.

4. The steering column of claim 3, wherein the first one of the bending legs secured on the steering spindle bearing unit rests at least during the deformation of the bending tab in contact on the second guide wall.

5. The steering column of claim 1, wherein the first one of the bending legs, secured on the steering spindle bearing unit, is disposed at a lesser distance from a rotational axis about which the steering spindle is rotatable than the regions of an outer wall of the steering spindle bearing unit, circumjacent to this bending leg.

6. The steering column of claim 1, wherein the holding-down device is a unit to be disposed on the steering spindle bearing unit.

7. The steering column of claim 1, wherein the holding-down device is an integrally formed-on component part of the steering spindle bearing unit.

8. The steering column of claim 1, wherein the nondestructively detachable connecting device comprises a swivelable hook with one or more snap-in teeth.

9. The steering column of claim 2, wherein the guide wall is a first guide wall, the holding-down device comprising a second guide wall, wherein the bending legs are at least regionally disposed between the first guide wall and the second guide wall disposed opposite one another.

* * * * *